United States Patent
Uchanski et al.

(10) Patent No.: US 12,519,676 B2
(45) Date of Patent: Jan. 6, 2026

(54) DIAGNOSTIC SYSTEM FOR ENGINE MANAGEMENT SYSTEM

(71) Applicant: Garrett Transportation I Inc., Torrance, CA (US)

(72) Inventors: Michael Uchanski, La Tour-de-Peilz (CH); Hab Collector, Atlanta, GA (US)

(73) Assignee: Garrett Transportation I Inc., Torrance, CA (US)

( * ) Notice: Subject to any disclaimer, the term of this patent is extended or adjusted under 35 U.S.C. 154(b) by 335 days.

(21) Appl. No.: 18/168,410

(22) Filed: Feb. 13, 2023

(65) Prior Publication Data

US 2024/0275634 A1   Aug. 15, 2024

(51) Int. Cl.
*H04L 12/40* (2006.01)
*B60R 16/023* (2006.01)
(Continued)

(52) U.S. Cl.
CPC ...... *H04L 12/40143* (2013.01); *B60R 16/023* (2013.01); *G07C 5/085* (2013.01);
(Continued)

(58) Field of Classification Search
CPC ............... H04L 12/40; H04L 12/4013; H04L 12/40143; H04L 2012/40208;
(Continued)

(56) References Cited

U.S. PATENT DOCUMENTS

| 8,930,067 B1 * | 1/2015 | Green ................. H04W 12/084 |
| | | 705/7.41 |
| 10,732,959 B2 * | 8/2020 | Jayaraman .......... H04L 41/0853 |

(Continued)

FOREIGN PATENT DOCUMENTS

CN    115589434 A    1/2023

OTHER PUBLICATIONS

Boggarapu, Verification & validation (V&V) to ensure high quality of complex automotive software, Sep. 10, 2020, Telematics Wire, https://www.telematicswire.net/verification-validation-vv-to-ensure-high-quality-of-complex-automotive-software/ (Year: 2020).*
International Search Report and Written Opinion dated May 31, 2024 for International Application No. PCT/US2024/012676.

*Primary Examiner* — Ramya P Burgess
*Assistant Examiner* — Sara J Lewandroski
(74) *Attorney, Agent, or Firm* — BelayIP

(57) ABSTRACT

A vehicle or powertrain management system include a diagnostic system. The diagnostic system includes a first module that is configured to communicate with a vehicle network and a second module that is configured to communicate with the first module. The first module includes operating instructions that define a set of access rules and the second module includes a set of diagnostic instructions. The second module, when executing the diagnostic instructions, makes one or more data requests that are communicated from the second module to the first module, and the first module is configured to permit permissible data requests to be communicated through the vehicle network to one or more of the plurality of ECUs and to prevent impermissible requests from being communicated through the vehicle network to one or more of the plurality of ECUs.

12 Claims, 6 Drawing Sheets

(51) Int. Cl.
*G07C 5/08* (2006.01)
*H04L 9/40* (2022.01)

(52) U.S. Cl.
CPC .... *H04L 2012/40273* (2013.01); *H04L 63/02* (2013.01); *H04L 63/0263* (2013.01)

(58) Field of Classification Search
CPC . H04L 2012/40215; H04L 2012/40267; H04L 2012/40273; H04L 41/06; H04L 41/0604; H04L 51/21; H04L 51/212; H04L 63/02; H04L 63/0227; H04L 63/0236; H04L 63/0245; H04L 63/0254; H04L 63/0263; B60R 16/023; B60R 16/0231; B60R 16/0232; B60R 16/0233; B60R 16/0234; B60R 16/0235; B60R 16/0236; G07C 5/02; G07C 5/04; G07C 5/08; G07C 5/0808; G07C 5/0816; G07C 5/0841; G07C 5/085; G07C 5/0858; G07C 5/10
See application file for complete search history.

(56) References Cited

U.S. PATENT DOCUMENTS

| | | | |
|---|---|---|---|
| 11,721,138 B1* | 8/2023 | Elmasri | G07C 5/085 |
| | | | 701/1 |
| 11,756,349 B2* | 9/2023 | Xu | G08G 1/0129 |
| | | | 701/23 |
| 2012/0113773 A1* | 5/2012 | Matsuo | G07C 5/085 |
| 2014/0005856 A1* | 1/2014 | Farnsworth | G05B 19/0426 |
| | | | 701/1 |
| 2015/0029987 A1 | 1/2015 | Addelpalli et al. | |
| 2017/0011561 A1* | 1/2017 | Makke | B60T 17/221 |
| 2017/0366521 A1* | 12/2017 | Lei | H04W 4/14 |
| 2018/0060267 A1* | 3/2018 | Sutton | G06F 13/4208 |
| 2019/0210545 A1* | 7/2019 | Sangameswaran | B60R 16/033 |
| 2022/0135075 A1* | 5/2022 | Ng | G06V 20/56 |
| | | | 701/301 |
| 2022/0179636 A1* | 6/2022 | Barry | B60R 16/023 |

* cited by examiner

DIAGNOSTIC SYSTEM FOR ENGINE MANAGEMENT SYSTEM

FIELD

The invention pertains generally to electronic controllers and more particularly to electronic controllers that are configured to permit data logging within a vehicle powertrain.

BACKGROUND

Hybrid, electric, fuel cell and other vehicles employ networked electronic controllers in order to control their powertrains. A vehicle network may include a number of electronic control units (ECUs) that manage operation of a variety of different vehicle and powertrain systems. A vehicle network allows communication between the ECUs as well as allowing communication between particular ECUs and the sensor(s) that provide relevant information to those particular ECUs in order to allow each ECU to successfully manage the vehicle and powertrain systems for which each ECU is responsible.

The introduction of on-vehicle wireless communications, frequently referred to as being part of a "connected vehicle", now makes it possible for auto manufacturers to log data from vehicles in the field and to analyze that data in their engineering teams with an aim of improving product quality. Capturing and storing all data is generally not done due to cost and memory constraints; most data is simply not needed and would not be reviewed. Instead, a data logging list (including variables to be logged and frequencies at which those variables are logged) may be configured during pre-production of a vehicle. There can be a number of different scenarios in which it may be desirable to change the data logging list post-production in order to obtain data from vehicles in use. This can include enabling remote roadside assistance, targeted product recalls, prognostics research and development, and customized data collection campaigns to help suppliers improve component quality and cost. However, prior to production, each ECU undergoes an extensive verification and validation process in order to ensure that each ECU will successfully communicate within the vehicle without causing any problems or faults for any of the other ECUs. In currently used systems, the data logging list is not something which can be quickly and easily updated due to the extensive validation efforts required. As a result, it can be difficult to quickly and safely obtain data from the ECUs of the powertrain (or elsewhere in a vehicle) in a manner that allows for fast, flexible data collection yet satisfies the need to protect the vehicle network and devices such as ECUs on the vehicle network from possible faults that could otherwise be caused.

An over-the-air update is the wireless delivery of new software, firmware, or other data to devices; such is relatively commonly used for cell phones and various consumer electronics, and is desirable in the vehicle space as well. Even with "over the air" software updates, which are now possible, the validation burden for a vehicle can still be substantial. For example, it is extremely unlikely that an automotive OEM (original equipment manufacturer) would perform an over-the-air update just to update the data logging list so that it can investigate a possible quality problem in a sub-population of vehicles. Releasing new software without correct validation would introduce risks of a safety problem. On the other hand, validating the release would likely be more expensive for the OEM than simply tolerating the potential quality problem.

Accordingly, there is a desire for new and/or alternative approaches to data collection within a vehicle or powertrain system that can simultaneously satisfy a desire for fast, customized data collection and a need to respect industry standard validation practices and to protect the vehicle network and the devices on the vehicle network.

OVERVIEW

The present inventors have recognized, among other things, that a problem to be solved is the need for new and/or alternative approaches to data collection within a powertrain management system, both when developing the powertrain system and after a particular vehicle is out in widespread use.

In an example, vehicle control system for a vehicle having a powertrain is provided. A powertrain may include an internal combustion engine. A powertrain may include a hybrid vehicle or even an electric vehicle that does not have an internal combustion engine. A powertrain may include a fuel cell, for example.

The powertrain includes a plurality of powertrain systems, each of which includes one or more Electronic Control Units (ECUs) and one or more sensors providing signals to each of the one or more ECUs. The vehicle control system includes a vehicle network that is configured to permit communication between the plurality of ECUs and to enable the sensors to provide signals to their corresponding ECUs, at least one of the plurality of ECUs controlling operation of a corresponding powertrain system of the plurality of engine systems in response to the received signals. The vehicle control system includes a diagnostic system configured to be installed in the vehicle and operably coupled with the vehicle network. The diagnostic system includes a first module that is configured to communicate with the vehicle network and a second module that is configured to communicate with the first module. The first module includes a first module memory that is configured to store operating instructions for the first module, the operating instructions including a set of access rules and a first module controller that is operably coupled with the first module memory, the first module controller configured to execute the operating instructions stored within the first module memory. The second module includes a second module memory that is configured to accept and store a set of diagnostic instructions that are communicated to the second module and a second module controller that is operably coupled with the second module memory, the second controller configured to execute the diagnostic instructions. The second module controller, when executing the diagnostic instructions, makes one or more data requests that are communicated from the second module to the first module, and the first module is configured to permit permissible data requests to be communicated through the vehicle network to one or more of the plurality of ECUs and to prevent impermissible requests from being communicated through the vehicle network to one or more of the plurality of ECUs.

Alternatively or additionally, the first module may include an ECU that has undergone a verification and validation process. Alternatively or additionally, the verification and validation process may include verification and validation of the set of access rules. Alternatively or additionally, the set of access rules may define a firewall implemented by the first module.

Alternatively or additionally, the firewall may be configured to enable permissible data requests to pass to the vehicle network and to prevent impermissible requests to pass to the vehicle network. Alternatively or additionally, the firewall may be configured to block any communication from the second module that exceeds a scope of a permissible data request. Alternatively or additionally, the set of access rule may include a first limit on how many data requests per time period the second module can make of any one ECU of the plurality of ECUs.

Alternatively or additionally, the set of access rules may include a second limit on how many total data requests per time period the second module can make collectively of two or more of the plurality of ECUs. Alternatively or additionally, the second module controller may be configured, when executing the diagnostic instructions, to solicit signals from any of the sensors. Alternatively or additionally, the second module controller may be configured, when executing the diagnostic instructions, to solicit operating parameter values from any of the plurality of ECUs as long as said solicitation complies with the set of access rules.

In another example, a diagnostic system is configured to be installed in a vehicle having a vehicle management system that manages operation of a plurality of vehicle systems, the vehicle management system including a plurality of vehicle systems, each of the plurality of vehicle systems including one or more Electronic Control Units (ECUs) and one or more vehicle sensors providing signals to each of the one or more ECUs, at least one of the plurality of ECUs controlling operation of a corresponding vehicle system of the plurality of vehicle systems in response to the received signals, the vehicle management system including a vehicle network that is configured to permit communication between the plurality of ECUs and to enable the vehicle sensors to provide signals to their corresponding ECUs. The add-on diagnostic system includes an access control module that is configured to communicate with the vehicle network and a programmable module that is configured to communicate with the access control module. The access control module includes an access control module memory that is configured to store operating instructions for the access control module, the operating instructions including a set of access rules and an access control module controller that is operably coupled with the access control module memory, the access control module controller configured to execute the operating instructions stored within the access control module memory. The programmable module includes a programmable module memory that is configured to accept and store a set of diagnostic instructions that are communicated to the programmable module and a programmable module controller that is operably coupled with the programmable module memory, the programmable module controller configured to execute the diagnostic instructions. The programmable module controller, when executing the diagnostic instructions, makes one or more data requests that are communicated from the programmable module to the access control module, and wherein the access control module is configured to permit permissible data requests to be communicated to the vehicle network and to prevent impermissible requests from being communicated to the vehicle network.

Alternatively or additionally, the set of access rules may define a firewall implemented by the access control module. Alternatively or additionally, the firewall may be configured to block any communication from the programmable module that exceeds a scope of a permissible data request. Alternatively or additionally, the set of access rule may include a first limit on how many data requests per time period the programmable module can make of any one ECU of the plurality of ECUs. Alternatively or additionally, the set of access rules may include a second limit on how many total data requests per time period the programmable module can make collectively of two or more of the plurality of ECUs. Alternatively or additionally, the programmable module controller may be configured, when executing the diagnostic instructions, to solicit signals from any of the vehicle sensors. Alternatively or additionally, the programmable module controller may be configured to, when executing the diagnostic instructions, to solicit operating parameter values from any of the plurality of ECUs as long as said solicitation complies with the set of access rules.

In another example, a method of obtaining vehicle operating values from a vehicle management system is provided. The vehicle management system includes a plurality of Electronic Control Units (ECUs) that control operation of a plurality of vehicle systems in accordance with sensed values provided by a plurality of vehicle sensors, the vehicle including a vehicle network that enables communication between the plurality of ECUs and the plurality of vehicle sensors. The method includes connecting an access control module to the vehicle network, the access control module configured to pass a verification and validation process, the access control module including an access control module memory configured to store operating instructions for the access control module and an access control module controller operably coupled with the access control module memory, the access control module controller configured to execute the operating instructions stored within the access control module memory. A programmable module is connected to the access control module, the programmable module configured to accept diagnostic instructions without a substantial verification and validation process, the programmable module including a programmable module memory that is configured to accept and store a set of diagnostic instructions that are communicated to the programmable module, and a programmable module controller operably coupled with the programmable module memory, the programmable module controller configured to execute the diagnostic instructions. The programmable module controller executes the diagnostic instructions in order to make one or more data requests for data from the plurality of vehicle sensors and/or the plurality of ECUs, the one or more data requests communicated to the access control module. The access control module executes the operating instructions in order to evaluate the one or more data requests from the programmable module. The access control module forwards the one or more data requests to the vehicle network when the one or more data requests comply with the operating instructions and blocks the one or more data requests from reaching the vehicle network when the one or more data requests do not comply with the operating instructions.

Alternatively or additionally, the method may further include the access control module forwarding the requested sensor values to the programmable module in accordance with the one or more data requests. Alternatively or additionally, the access control module may be configured to protect the vehicle management system from errors that could otherwise be caused by the diagnostic instructions.

In another example, a method of updating a vehicle diagnostics system is provided. The vehicle diagnostic system configured for use in a vehicle having a plurality of Electronic Control Units (ECUs) coupled to a vehicle network, the ECUs controlling operations in the vehicle and including a diagnostic module comprising a memory for recording diagnostics data and containing diagnostics instructions, and a diagnostics controller configured to execute the diagnostics instructions to obtain diagnostics data from the ECUs via the vehicle network, and an access control module operatively coupling the diagnostic module to the vehicle network and configured to receive communications from the diagnostic module directed to the ECUs, apply access rules to the received communications, and only pass data requests from the diagnostics module through to the vehicle network which pass the access rules, the method comprising updating the diagnostics module to change communications from the diagnostics module issued through the access control module from first diagnostic configuration to a second diagnostic configuration, without updating the access control module.

Additionally or alternatively, the step of updating the diagnostics module is performed without validating effects on the ECUs and vehicle network. Additionally or alternatively, the step of updating the diagnostics module is performed by defining the second diagnostic configuration, validating the second diagnostic configuration as it affects the diagnostics module and access control module, and deploying the second diagnostic configuration to the diagnostics module via an over the air update.

This overview is intended to provide an introduction to the subject matter of the present application. It is not intended to provide an exclusive or exhaustive explanation of the concept. The detailed description is included to provide further information about the present application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
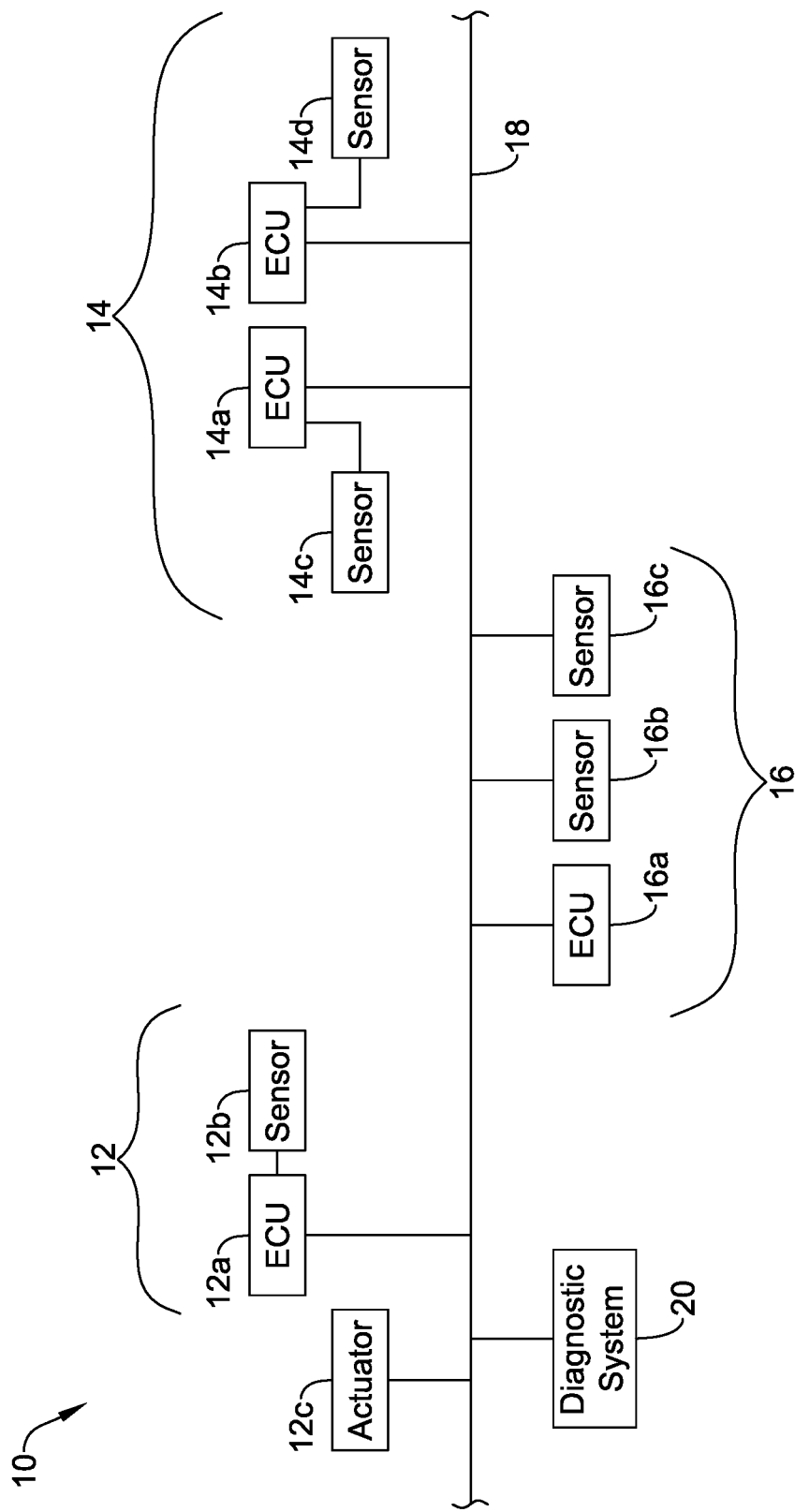
FIG. 1 is a schematic block diagram of a portion of an illustrative vehicle control system including a diagnostic system.

FIG. 1 is a schematic block diagram of a portion of an illustrative vehicle control system 10. The illustrative vehicle control system 10 includes a number of vehicle subsystems 12, 14 and 16. While three vehicle subsystems 12, 14 and 16 are shown, it will be appreciated that this is merely illustrative, as the vehicle control system 10 may include a large number of vehicle subsystems. Vehicle subsystems such as the vehicle subsystems 12, 14 and 16 can include a variety of different vehicle or powertrain systems that monitor and control operation of an vehicle or powertrain such as, for example and without limitation, battery monitoring systems, thermal management systems, fuel cell control and/or monitoring systems, fuel injection systems, ignition timing systems, air management systems, and/or pollution control systems that monitor a variety of performance parameters to ensure that emissions are meeting or exceeding pollution performance requirements, and other vehicle or powertrain systems. Vehicle or powertrain systems such as the vehicle subsystems 12, 14 and 16 can include a variety of systems that monitor and control operation of ancillary systems such as braking systems, traction control systems, stability control systems, HVAC (heating, ventilating and air conditioning) systems, navigation systems, entertainment systems, automated driving systems, and the like. As an example, the vehicle subsystem 12 may be an engine management system, the vehicle subsystem 14 may be a battery management system and the vehicle subsystem 16 may be a thermal management system.

Each of the vehicle subsystems 12, 14 and 16 can include one or more ECUs (electronic control unit), one or more sensors and may include one or more actuators. Actuators may be mechanical actuators, for example, or electromechanical actuators. Actuators may be electronic. An actuator is something that affects movement in response to a received signal. Some engine systems may not include any actuators. Actuators may include, for example and without limitation, dampers, valves, fans, motors, etc. In a vehicle's HVAC system, an actuator may move a damper in order to increase or decrease a relative flow of heated air, if heat is requested, or cooled air, if cooling is requested. In an anti-lock braking system, or perhaps a traction control or even a stability control system, an actuator may be the caliper that applies (or releases) the brake at a particular wheel in response to signals indicating that the wheel is beginning to lose traction, for example. In a fuel injection system, an actuator may vary how much fuel is released. These are just examples.

An ECU is a controller that receives data from the one or more sensors and determines an output. The output from the ECU may be a control signal going to an actuator, for example, or it may be an input to another ECU. As shown, the vehicle subsystem 12 includes an ECU 12a, a sensor 12b and an actuator 12c. The sensor 12b may be directly connected to the ECU 12a, such as by physical wire, optical link, or wireless transmission link, for example. The vehicle subsystem 14 includes an ECU 14a and an ECU 14b. The engine system 14 also includes a sensor 14c and a sensor 14d. The sensor 14c may be directly connected to one ECU 14a while the sensor 14d may be directly connected to another ECU 14b. The vehicle subsystem 16 includes an ECU 16a, a sensor 16a and a sensor 16c. As shown, the sensor 16a and the sensor 16c are not directly connected to the ECU 16a, but instead communicate with the ECU 16a via a vehicle network 18. As will be appreciated, each vehicle or powertrain system such as the vehicle subsystems 12, 14 and 16 may include one ECU or a plurality of ECUs that work together to control and manage operation of a particular vehicle or powertrain system. Each vehicle subsystem such as the vehicle subsystems 12, 14 and 16 may include a single sensor or a plurality of sensors.

Each of the vehicle subsystems 12, 14 and 16 are operably coupled to the vehicle network 18. In some cases, the ECU 12a can receive sensor signals from the sensor 12b over the vehicle network 18, although in some cases the sensor 12b may be directly connected to the ECU 12a, as shown. The ECU 12a can send commands to the actuator 12c over the vehicle network 18. The individual components of the vehicle subsystem 14 can communicate with each other over the vehicle network 18. The individual components of the vehicle subsystem 16 can communicate with each other over the vehicle network 18. The vehicle subsystems 12, 14 and 16 can communicate with each other over the vehicle network 18, such as the ECU 12a communicating with the ECU 14a, or perhaps the ECU 16a. As a result, the vehicle subsystems 12, 14 and 16 can work together to manage operation of the vehicle control system 10.

In some examples, the vehicle network may be implemented as a controller area network (CAN) bus, configured according to various ISO 11898 standards. Other communication networks, such a Ethernet, as well as wireless communication may be used instead or in addition to a CAN bus.

In some examples, actuators and/or sensors may be configured as "smart" sensors and/or actuators that are configured to communicate with one or more ECUs via the vehicle network by each having its own controller, such as a microcontroller, microprocessor or state machine. When a smart sensor/actuator is configured to listen for and respond to diagnostic requests, it may be treated, to some extent, as an additional ECU within the control system having relatively limited functionality. When diagnostic queries are sent within the vehicle network from an ECU to obtain data from a sensor/actuator, such queries may be sent, for example, by sending queries directly to a smart sensor/actuator, or by querying the appropriate ECU which is linked to the sensor or actuator to obtain, for example, the appropriate variables stored by the queried ECU relating to state of or other information about the sensor/actuator.

Each of the ECUs 12, 14a, 14b, 16a may be considered as having undergone a rigorous verification and validation process to ensure that each of the ECUs 12, 14a, 14b, 16a are able to work correctly with each of the other ECUs 12, 14a, 14b, 16a without causing any problems such as faults for any of the other ECUs 12, 14a, 14b, 16a. It will be appreciated that potential faults caused by inappropriate communication between the ECUs 12, 14a, 14b, 16a could cause problems for the vehicle control system 10. A fault that causes a particular ECU to "hang up" or "crash" can cause a variety of problems. A fault could cause the vehicle control system 10 to lose control of the performance of the vehicle or powertrain component being controlled by the vehicle control system 10, causing the engine to stall. A fault could cause an anti-lock brake system to fail, for example. Other, more likely faults include generation of diagnostic trouble codes (DTCs) requiring DTC investigation at subsequent maintenance, as well as faults which can impair vehicle performance, increasing emissions or causing reduced power or fuel efficiency. These are just a few examples, and illustrate why each component of the vehicle control system 10 undergoes a rigorous verification and validation process.

At the level of the vehicle network and ECU configuration of a vehicle control system 10, the verification and validation (V&V) process will be briefly described. The vehicle control system and vehicle network will typically be subject to a set of access rules. For a given set of access rules, {A1, A2, A3, . . . AN}, the validation plan includes several tiers. At the ECU unit level, V&V is performed on each ECU individually against the most technically challenging requests that the ruleset A1-AN would allow on that ECU. This can be achieved, by showing, for example, that the ECU operates with ample resource buffer when challenged with the maximum permissible requests sent to it. Alternately and additionally, this can be achieved by demonstrating that the ECU contains a mechanism such as a firewall that will cause it to reject requests beyond a certain safe frequency. The unit V&V would require configuring and executing test for a range of combinations of requests and/or firewall incursions. In a second step of validation, the entire network containing all of the ECUs is subjected to the most challenging request configuration(s) allowed by the access ruleset A1-AN. Parameters such as network load and dropped or delayed message count can be recorded with standard network analysis tools or with cyber security network analysis engines. Since each ECU individually can operate safely against the most challenging request configurations allowed by the ruleset and since the network as a whole can operate safely against the most challenging request configurations allowed by the ruleset, it can be concluded with very high certainty that the vehicle will operate safely in the presence of any request adhering to ruleset A1-AN. The V&V plan may include thousands of test cases, each of which must be identified, configured, reviewed against underlying requirements, executed, and then reviewed to determine pass/fail on the V&V. While a fair amount of software related V&V can be automated, the tasks involved still require substantial time and resource investment.

V&V is not simply performed once. Each time a change is made to the vehicle control system, additional quality system activity is required. Typically a change is defined, and a ripple effects analysis follows to identify those portions of the network, as well as test cases, that are likely to be affected by the changes to be made. New test cases may be generated, and some existing test cases may be re-executed as part of the updated V&V. Again, substantial investment of time and resources is needed.

In some cases, there may be a desire to obtain data from one or more of the ECUs 12, 14a, 14b, 16a in a diagnostic situation, for example. Doing so during a standard maintenance visit is relatively simple, as the vehicle control system will be configured to allow authorized maintenance systems to interact more or less freely with parts of the vehicle network. However, in doing so, the maintenance system can only access that data with has already been recorded during actual operation. Data that has not been maintained cannot be obtained. In existing systems, to update the diagnostic data storage rules would require changing the overall vehicle network, necessitating new V&V as just described. Updated configurations are therefore desired.

In some cases, the vehicle control system 10 may include a diagnostic system 20. The diagnostics system 20 may, for example, include one or more ECUs that can be operably coupled with the vehicle network 18. The diagnostics system 20 may include one or more processors for performing specific diagnostic functions and/or other control calculations, serving for example as a centralized computing resource for the engine management system as discussed in U.S. patent application Ser. No. 17/241,668, filed Apr. 27, 2021 and titled ADVANCED CONTROL FRAMEWORK FOR AUTOMOTIVE SYSTEMS, the disclosure of which is incorporated herein by reference. In some examples, the diagnostics system 20 may be kept separate from the vehicle or powertrain management system 10, and only connected or activated when there is a need to safely obtain diagnostic data. In some cases, the diagnostic system 20 may be factory installed as part of the vehicle control system 10, and only activated when there is a need to safely obtain diagnostic data.

As will be discussed, in some examples, the diagnostic system 20 may be configured to receive an "over-the-air" software update, and a buffer component that acts as a buffer between the vehicle or powertrain management system 10 and the diagnostic component. In some examples, the buffer may be configured to establish a set of access rules for the diagnostic component, relative to the rest of the vehicle control system, thereby protecting the vehicle control system 10 from possible problems that could otherwise be caused by the diagnostic component being updated. For example, the diagnostic component may be configured to be reprogrammed when a need arises for diagnostic data and without requiring complete V&V on the vehicle control system. The buffer component may be configured to receive data requests from the diagnostic component and ascertain whether particular data requests are appropriate, applying a set of buffer component access rules, for example. An illustrative buffer component access rule may be configured to allow (limit) a particular rate of data requests to a particular ECU, or to allow a composite rate of data requests for all ECUs. How many data requests the buffer component allows through may be part of a V&V process that is applied to the entire vehicle system. Data requests that satisfy the verified and validated limits on data requests are passed on from the diagnostic component through the buffer component to one or more ECUs on the vehicle network 18 while data requests that do not satisfy these limits are blocked. What that means is that the diagnostic component can be configured and reconfigured as needed without necessitating revalidation of the rest of the vehicle control system. Instead, validation may be limited to just the diagnostic component and the buffer component, greatly reducing, or even eliminating the ripple effect analysis and revalidation efforts as changes are made.

As to the described structure, the typical approach to creating a firewall or intrusion detection system is outward facing relative to the vehicle control system. That is, for example and without limitation, a firewall may be provided in a vehicle control system between a communications port (such as a wireless connection) and the rest of the system, to protect against external attacks. Here, the buffer is provided between internal components of the system. Doing so enables revision to the diagnostic data logging more or less at will.

Figure 2:
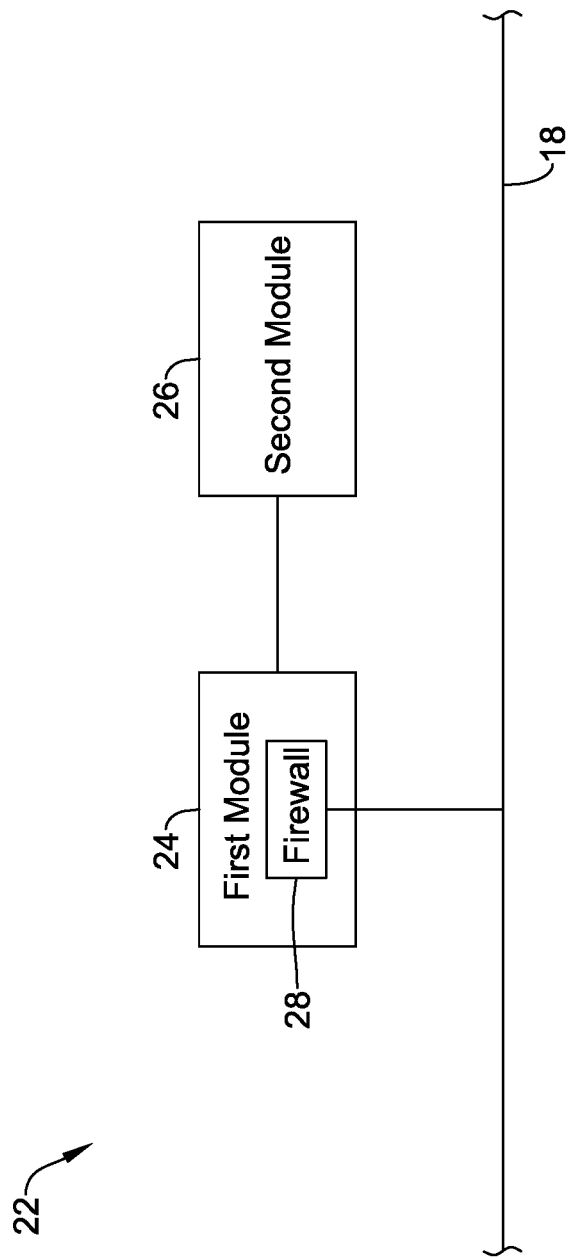
FIG. 2 is a schematic block diagram of an illustrative diagnostic system usable with the illustrative vehicle control system of FIG. 1.

FIG. 2 is a schematic block diagram of an illustrative diagnostic system 22 that may be considered as being an example of the diagnostic system 22. The diagnostic system 22 includes a first module 24 and a second module 26. In some cases, the first module 24 may be considered as an example of the buffer component discussed with respect to FIG. 1 while the second module 26 may be considered as an example of the diagnostic component. In some cases, the first module 24 may undergo a substantial verification and validation process, as part of overall system V&V, while the second module 26 does not. This allows diagnostic instructions to be quickly provided to the second module 26, with the first module 24 protecting the vehicle control system. In another example, the first module 24 and second module 26 may each undergo an initial V&V process along with the rest of the vehicle control system, however, for subsequent updates to the second module 26, only the second module would require V&V review, which may be substantially less burdensome than overall system V&V. In still another example, updating of the second module may require only V&V for the first and second modules 24, 26, with the results showing that the first module 24 operates correctly relative to the rest of the vehicle network in response to the changes to the first module 26. In yet another example, changes may be made, either by reprogramming or reconfiguring the first module 24 without requiring validation, to the extent the module 26 is present to buffer the rest of the vehicle control system from any negative outcomes.

The first module 24 includes or otherwise provides a firewall 28 that serves to limit communication from the first module 24 to the vehicle network 18. The firewall 28 may be a hardware firewall. In some cases, the firewall 28 may be manifested in software. The second module 26 may provide data requests to the first module 24. The first module 24 may determine which data requests are appropriate and which data requests are not appropriate. Data requests that are determined to be appropriate are allowed to pass through the firewall 28 and enter the vehicle network 18. From there, the data requests that were determined to be appropriate travel to an appropriate ECU. Data requests that are determined to not be appropriate are blocked from passing through the firewall 28 and reaching the vehicle network 18.

In some cases, the first module 24 may itself be an ECU. The second module 26 may be a separate ECU. In some instances, the first module 24 and the second module 26 may both be provided within a single ECU. The second module 26 may not be an ECU, and instead may simply represent a portable handheld device such as but not limited to a smartphone, a tablet, a phablet or even a laptop computer, for example. The second module 26 may communicate wirelessly with the first module 24, for example, using any desired wireless communications protocol such as but not limited to BLE (Bluetooth low energy). The second module 26 may have a physical connection (electrical, optical, etc.) with the first module 24.

The diagnostic system 22 may be connected to the vehicle network 18, or otherwise activated, in order to obtain diagnostic data that is not otherwise readily available on the vehicle network 18. As an illustrative but non-limiting example, suppose a new quality issue has arisen after a vehicle launch, and that a disproportionate number of turbochargers are being replaced as a result. An engineering team investigating the issue believes that an early indication of the issue developing is a large tracking error between the commanded position of an actuator (for example a wastegate, a variable geometry turbine, or exhaust gas recirculation valve) and the actual actuator position. Unfortunately, these two position variables are not broadcast on the vehicle network 18.

A possible solution is to create a new software version for the TCU (telematics control unit) that a) asks the engine controller to send the commanded and actual actuator positions, and b) computes the difference between the two positions and send the largest differences each day back to the manufacturer. While this software is easy to create, proving that the new software will not interfere with vehicle operation is more problematic. Theoretically, the additional data queries could affect the engine controller, or the additional bus load due to two new time series traveling on the vehicle network 18 could cause some messages to be dropped. Both are unlikely, but possible. Further, a programming error in the new software could cause the TCU to reboot or freeze, potentially leading to unanswered queries from other ECUs. It could take weeks or months to verify and validate the new software. This can lead to delays in obtaining the necessary data, and may result in an unnecessarily broad recall.

A better solution involves the use of the diagnostic system 22. The firewall 28 within the first module 24 has already been verified and validated to allow a certain number of data requests to pass through the firewall 28 without causing problems for any other components within the engine management system 10 (FIG. 1). For example, the firewall 28 within the first module 24 may be programmed to allow up to two data requests per second to/from a single ECU, and to allow a total of twenty data requests per second to/from all ECUs, regardless of the target ECU. The first module 24 is configured to disallow write requests, non-diagnostic requests (commanding a change to an actuator position for example) or other potentially harmful actions to the ECUs within the vehicle. The first module 24 and overall vehicle control system are validated with these limits on data requests. As part of the verification and validation process, the first module 24 is demonstrated to be able to safely allow data requests within the limits while isolating the rest of the vehicle control system 10 from any problems such as a frozen processor or a babbling transceiver that could otherwise result from a coding error in the diagnostic software present within the second module 26.

Post-release, in this example, software can be quickly written for the second module 26 that facilitates collecting the two necessary data inputs and to store/process them. Because the first module 24 prevents the second module 26 from interfering with network activity, the software can be quickly released to the second module 26, and the data can be collected. This provides a faster way to safely answer "what if" questions. While this example has been described with respect to a possible turbocharger problem, it will be appreciated that this is merely illustrative, and is not intended to be limiting in any manner; any sensor or actuator or other componentry in the vehicle may be addressed. In another example, rather than an uploaded new code or software module, data capture settings or query instructions may be loaded to the second module 26. That is, rather than new software, new settings may be generated and applied.

Figure 3:
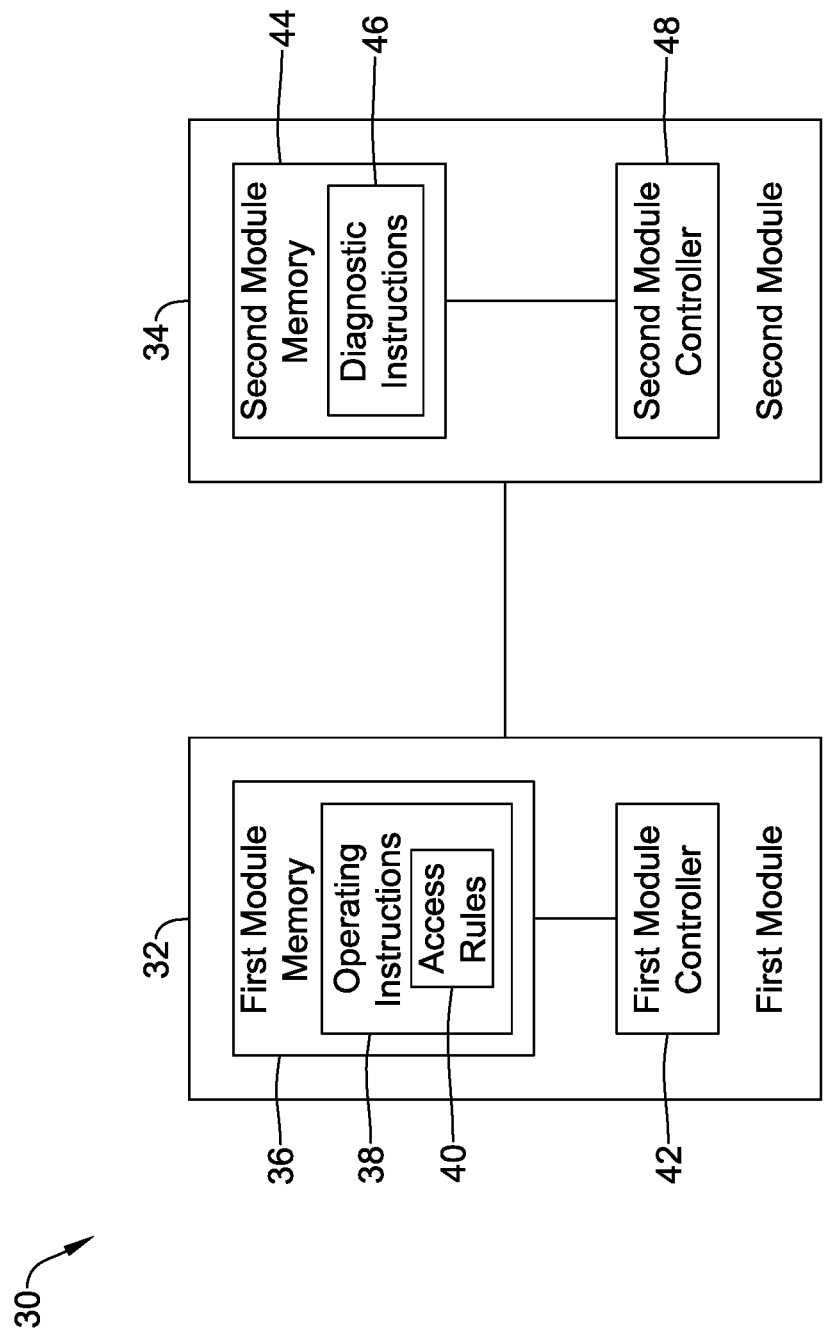
FIG. 3 is a schematic block diagram of an illustrative diagnostic system usable with the illustrative vehicle control system of FIG. 1.

FIG. 3 is a schematic block diagram of an illustrative diagnostic system 30. The illustrative diagnostic system 30 may be considered as being an example of the diagnostic system 20 (FIG. 1) and/or the diagnostic system 22 (FIG. 2). The diagnostic system 30 may be a diagnostic system that is configured to be installed in the vehicle and operably coupled with the vehicle network 18 when there is a need to safely obtain diagnostic data. The diagnostic system 30 may be factory installed as part of the vehicle control system 10, in some cases. The diagnostic system 30 includes a first module 32 that is configured to communicate with the vehicle network 18 and a second module 34 that is configured to communicate with the first module 34.

The first module 32 includes a first module memory 36 that is configured to store operating instructions 38 for the first module, the operating instructions including a set of access rules 40. The operating instructions 38 govern operation of the first module 32 and may be considered as being verified and validated. The first module 32 includes a first module controller 42 operably coupled with the first module memory 36 and is configured to execute the operating instructions 38 that are stored within the first module memory 36. The access rules 40 govern which data requests from the second module 34 may be passed through to the vehicle network 18 and which data requests from the second module 34 are blocked from reaching the vehicle network 18.

The second module 34 includes a second module memory 44 that is configured to accept and store a set of diagnostic instructions 46 that are communicated to the second module 34. In some instances, the diagnostic instructions 46 may include or otherwise represent the software that may be quickly written (without verification or validation) in order to obtain the data necessary to prove or disprove a theory as to the cause of a particular problem, for example. The diagnostic instructions 46 inform the second module 34 of the desired data, for example. The second module 34 also includes a second module controller 48 that is operably coupled with the second module memory 44 and is configured to execute the diagnostic instructions 46.

The second module controller 48, when executing the diagnostic instructions 46, makes data requests that are communicated from the second module 34 to the first module 32, and the first module 32 is configured to permit permissible data requests to be communicated through the vehicle network 18 to one or more of the plurality of ECUs and to prevent impermissible requests from being communicated through the vehicle network 18 to one or more of the plurality of ECUs. Impermissible requests may include, for example and without limitation, data requests that are too frequent in comparison to one or more defined access rules, and/or requests which are not data requests such as commands to write data or to change an actuator position or cause other action by a system component. The second module controller 48 may be configured, when executing the diagnostic instructions 46, to solicit signals from any of the vehicle sensors, actuators and/or ECUs. The second module controller 48 may be configured, when executing the diagnostic instructions 46, to solicit operating parameter values from any of the plurality of ECUs as long as said solicitation is in compliance with the set of access rules 40.

In some instances, the first module 32 may include an ECU that has undergone a verification and validation process. The verification and validation process may include verification and validation of the set of access rules 40. In some cases, the set of access rules 40 may define a software firewall that is implemented by the first module 32. The firewall may be configured to enable permissible data requests to pass to the vehicle network 18 and to prevent impermissible requests to pass to the vehicle network 18. The firewall may be configured to block any communication from the second module 34 that exceeds a scope of a permissible data request. The firewall may prevent any communication which is not a data request (a write or other action request, for example, may be blocked). As an example, the set of access rules 40 may include a first limit on how many data requests per time period the second module can make of any one ECU of the plurality of ECUs. The set of access rules 40 may include a second limit on how many total data requests per time period the second module can make collectively of two or more of the plurality of ECUs. As an example, the first limit may be set equal to two (2) data requests of a specific ECU per second and the second limit may be set equal to twenty (20) data requests collectively of all ECUs per second. These limits are merely examples, and may be set differently.

Figure 4:
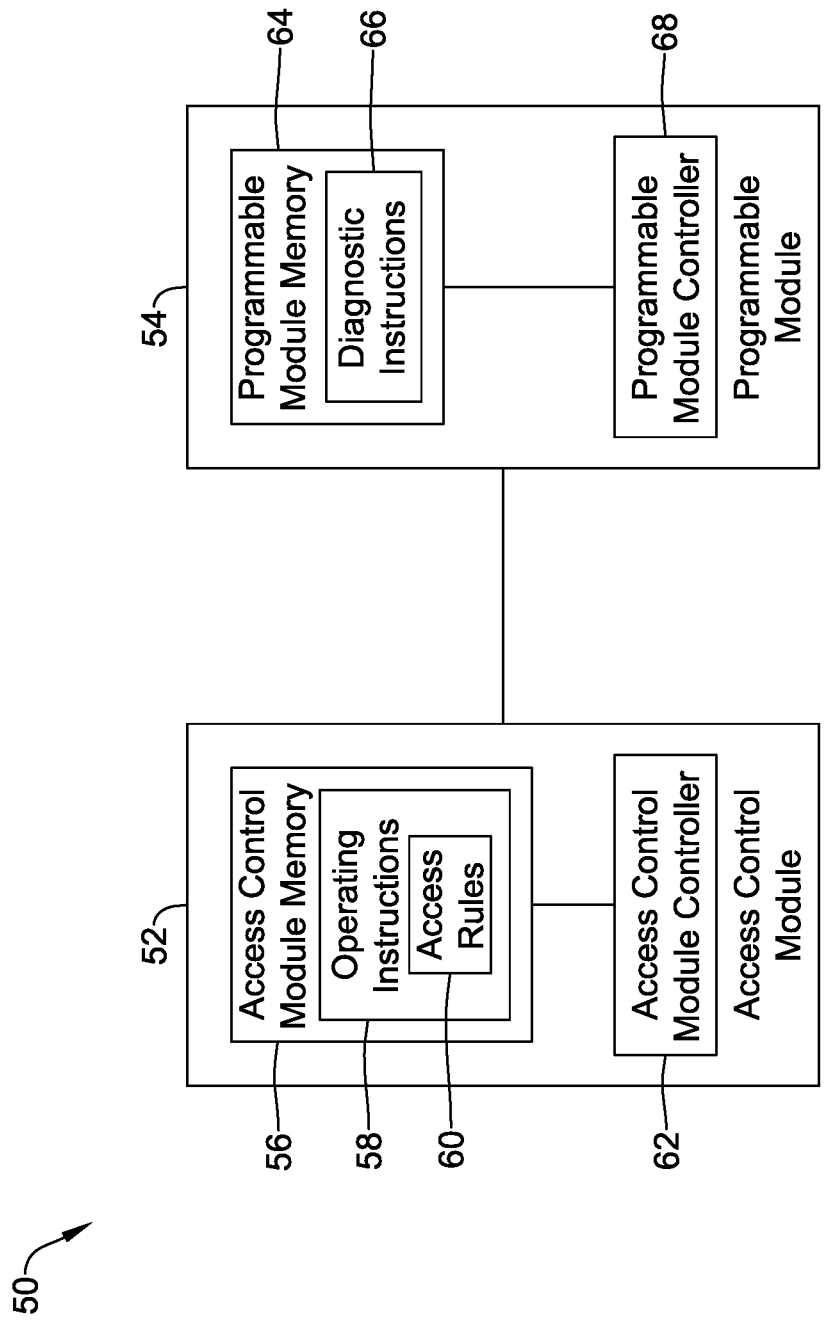
FIG. 4 is a schematic block diagram of an illustrative diagnostic system usable with the illustrative vehicle control system of FIG. 1.

FIG. 4 is a schematic block diagram of an illustrative diagnostic system 50. The illustrative diagnostic 50 may be considered as being an example of the diagnostic system 20, the diagnostic system 22 and/or the diagnostic system 30. The diagnostic system 50 may be an add-on diagnostic system that is configured to be installed in the vehicle and operably coupled with the vehicle network 18 when there is a need to safely obtain diagnostic data. The diagnostic system 50 may be factory installed as part of the engine management system 10, in some cases. The diagnostic system 50 includes an access control module 52 that is configured to communicate with the vehicle network 18 and a programmable module 54 that is configured to communicate with the access control module 52.

The access control module 52 includes an access control module memory 56 that is configured to store a set of operating instructions 58 for the access control module 52, the operating instructions including a set of access rules 60. The operating instructions 58 govern the operation of the access control module 52 and may be considered as being verified and validated. The access control module 52 also includes an access control module controller 62 that is operably coupled with the access control module memory 56 and is configured to execute the operating instructions 58 that are stored within the access control module memory 56. The access rules 60 govern which data requests from the programmable module 54 may be passed through to the vehicle network 18 and which data requests from the programmable module 54 are blocked from reaching the vehicle network 18.

The programmable module 54 includes a programmable module memory 64 that is configured to accept and store a set of diagnostic instructions 66 that are communicated to the programmable module 54. In some instances, the diagnostic instructions 66 may include or otherwise represent the software that may be quickly written (without verification or validation) in order to obtain the data necessary to prove or disprove a theory as to the cause of a particular problem, for example. The diagnostic instructions 66 inform the programmable module 54 of the desired data, for example. The programmable module 54 also includes a programmable module controller 68 that is operably coupled with the programmable module memory 44 and is configured to execute the diagnostic instructions 66.

The programmable module controller 68, when executing the diagnostic instructions 66, makes one or more data requests that are communicated from the programmable module 54 to the access control module 52, and the access control module 52 is configured to permit permissible data requests to be communicated through to the vehicle network 18 and addressed to one or more of the plurality of ECUs and to prevent impermissible requests from being communicated through the vehicle network 18 to one or more of the plurality of ECUs. The programmable module controller 68 may be configured, when executing the diagnostic instructions 66, to solicit signals from any of the vehicle sensors. The programmable module controller 68 may be configured, when executing the diagnostic instructions 46, to solicit operating parameter values from any of the plurality of ECUs as long as said solicitation is in compliance with the set of access rules 60.

In some instances, the access control module 52 may include an ECU that has undergone a verification and validation process. The verification and validation process may include verification and validation of the set of access rules 60. In some cases, the set of access rules 60 may define a software firewall that is implemented by the access control module 52. The firewall may be configured to enable permissible data requests to pass to the vehicle network 18 and to prevent impermissible requests to pass to the vehicle network 18. The firewall may be configured to block any communication from the programmable module 54 that exceeds a scope of a permissible data request. As an example, the set of access rules 60 may include a first limit on how many data requests per time period the second module can make of any one ECU of the plurality of ECUs. The set of access rules 60 may include a second limit on how many total data requests per time period the second module can make collectively of two or more of the plurality of ECUs. As an example, the first limit may be set equal to two (2) data requests of a specific ECU per second and the second limit may be set equal to twenty (20) data requests collectively of all ECUs per second. Limits may also determine the type of message that can pass, for example, limiting messages to data requests as opposed to commands. These limits are merely examples, and may be set differently.

Figure 5:
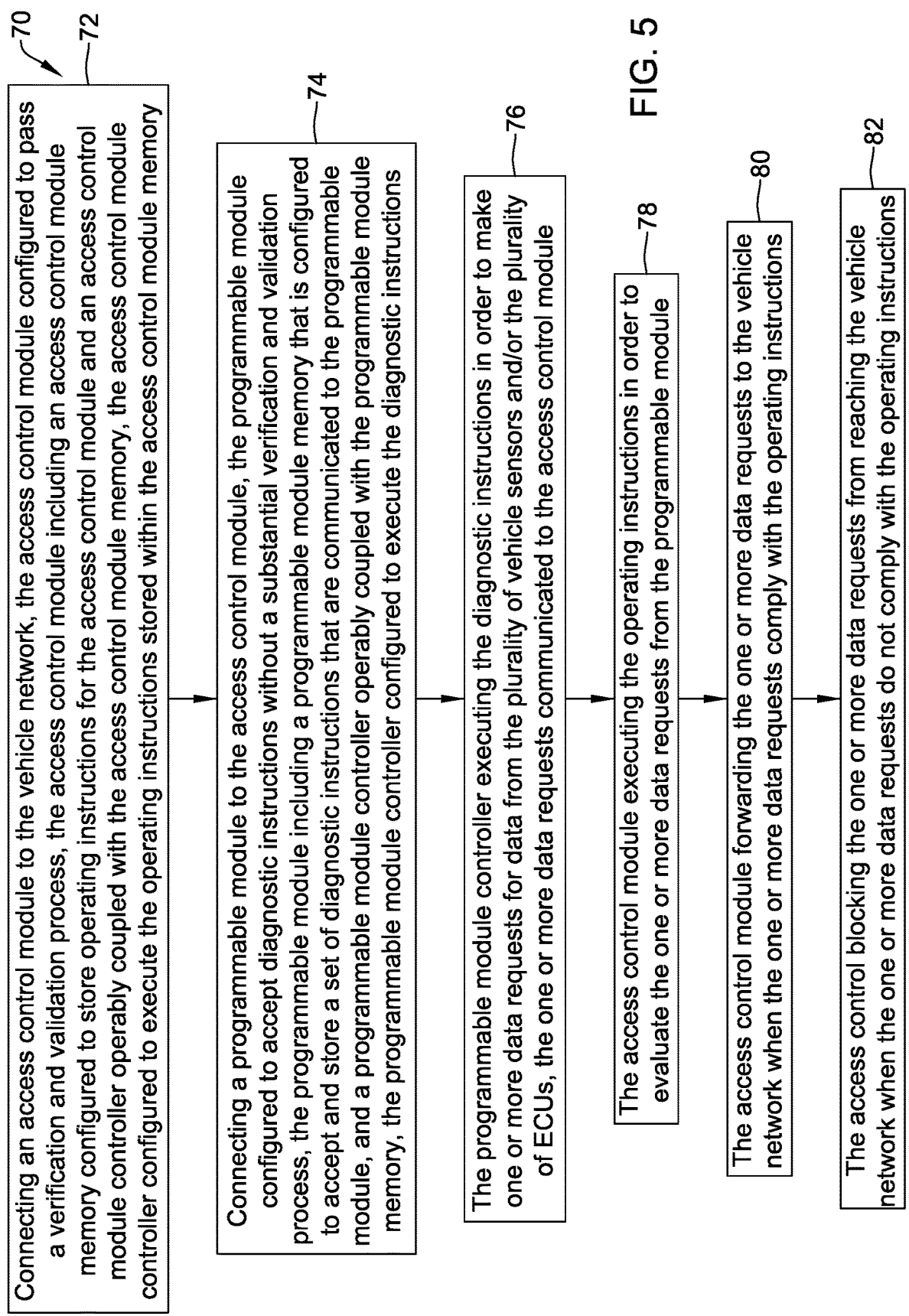
FIG. 5 is a flow diagram showing an illustrative method.

FIG. 5 is a flow diagram showing an illustrative method 70 of obtaining vehicle operating values from a vehicle management system (such as the vehicle control system 10) having a plurality of Electronic Control Units (ECUs) (such as the ECUs 12a, 14a, 14b, 16a) that control operation of a plurality of vehicle systems in accordance with sensed values provided by a plurality of vehicle sensors (such as the sensors 12b, 14c, 14db, 16a, 16c), the vehicle including a vehicle network (such as the vehicle network 18) that enables communication between the plurality of ECUs and the plurality of vehicle sensors. The method 70 includes connecting an access control module to the vehicle network in pre-production, the access control module configured to pass a verification and validation process in pre-production, the access control module including an access control module memory configured to store operating instructions for the access control module and an access control module controller operably coupled with the access control module memory, the access control module controller configured to execute the operating instructions stored within the access control module memory, as indicated at block 72.

In some cases, the access control module and the ECUs and the vehicle network would typically undergo V&V under the most challenging loading scenarios permitted by the ruleset. Validating just the access control module in isolation might also be possible, but in this case the safe limits of each ECU (type and requests per second) and of the overall network (type of traffic and requests per second) would need to know in advance and the ruleset shown to comply with these limits. In other examples, verification and validation of the integrated system may be performed.

A programmable module is connected to the access control module, the programmable module configured to accept diagnostic instructions without a substantial verification and validation process post-production/release, the programmable module including a programmable module memory that is configured to accept and store a set of diagnostic instructions that are communicated to the programmable module, and a programmable module controller operably coupled with the programmable module memory, the programmable module controller configured to execute the diagnostic instructions, as indicated at block 74.

In an example, some design inputs and features, software elements, etc., may be categorized as safety-related, or safety-critical, while others are not. Any V&V procedure for a safety-related, and in particular, safety-critical aspects of the design of a vehicle will necessarily be substantial. For example, safety-critical elements may be subject to V&V according to ISO 26262 and/or ASIL part C or part D level verification. Changes which do not bring into question safety-related or safety-critical features fall outside of the "substantial" V&V. Whether a change has a ripple effect to the safety-critical aspects of a design can be determined on whether the item subject to change, or any item connected to the item subject to change, is safety-critical.

In an example, returning briefly to FIG. 2, the first module 24 may not itself be considered safety-critical, but because the first module 24 links to the vehicle network 18, through which safety-critical systems, modules, actuators, sensors or the like are accessible, a change to the first module 24 would require substantial V&V, because the first module 24 is connected to safety-critical elements of the system. However, the second module 26 only connects to the first module 24. Changes to the second module 26 are not safety-critical and thus not subject to the substantial V&V triggered by safety-critical status. The most a change to the second module 26 can affect is the frequency or type of requests made by the first module 26 of the second module 24, which, in an example, would be handled/limited by the permissions defined for the firewall 28. The configuration is different from, for example, a system in which a database is provided to capture all operating parameters over time, where queries can be issued to the database as needed. Providing such a memory module/database in the vehicle would add costs, and the number of data points that could arise is so large as to make such a system largely infeasible. What happens with such a database/query system is that capture data has to be purged, typically on a first-in, first-out basis, though arrangements can be made to segregate critical data to be retained permanently or for longer than other data types.

Returning now to FIG. 5, the programmable module controller executes the diagnostic instructions in order to make one or more data requests for data from the plurality of vehicle sensors and/or the plurality of ECUs, the one or more data requests communicated to the access control module, as indicated at block 76.

The access control module executes the operating instructions in order to evaluate the one or more data requests from the programmable module, as indicated at block 78. The access control module forwards the one or more data requests to the vehicle network when the one or more data requests comply with the operating instructions, as indicated at block 80. The access control module blocks the one or more data requests from reaching the vehicle network when the one or more data requests do not comply with the operating instructions, as indicated at block 82. The access control module is configured to protect the vehicle management system from errors that could otherwise be caused by the diagnostic instructions.

Figure 6:
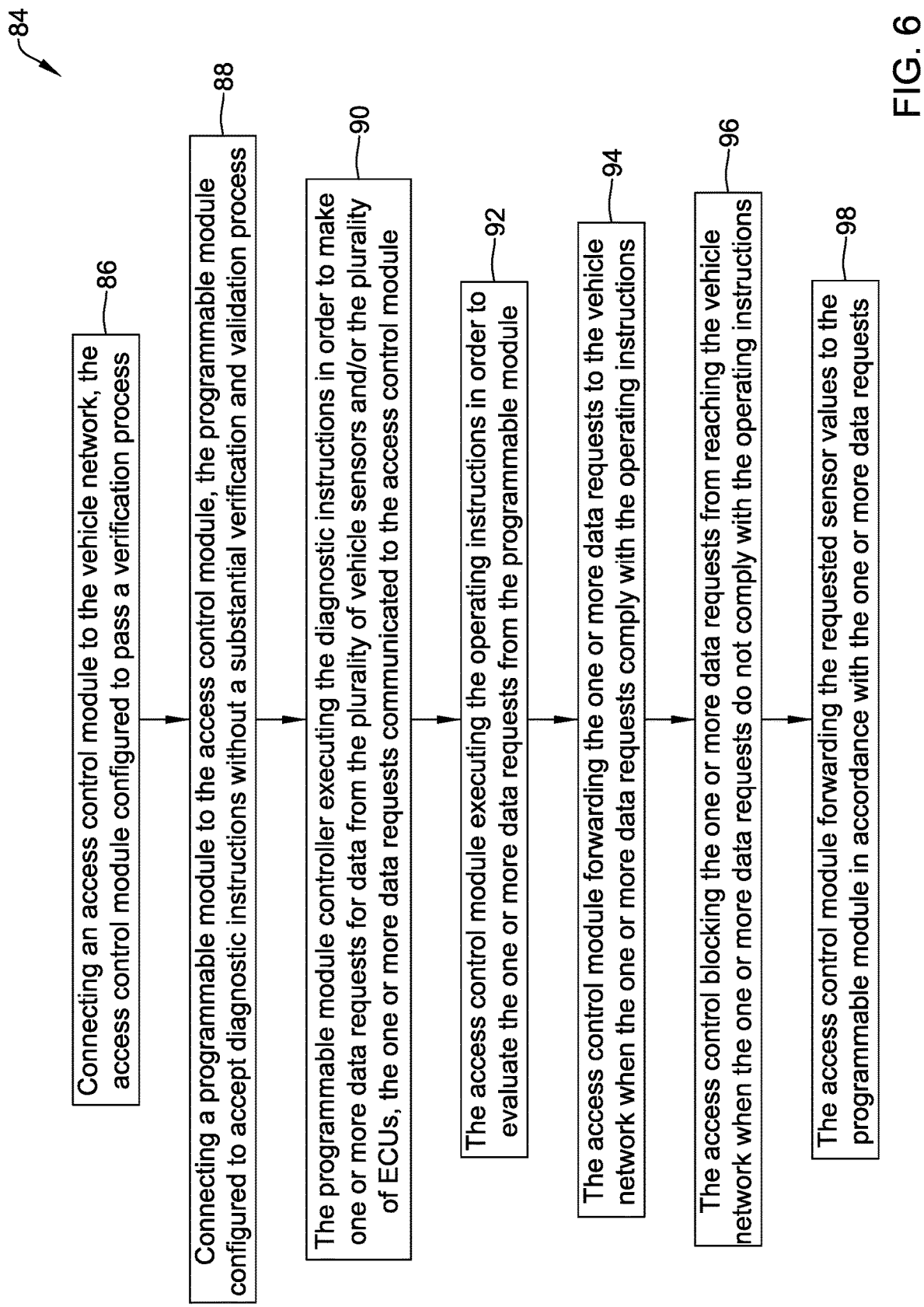
FIG. 6 is a flow diagram showing an illustrative method.

FIG. 6 is a flow diagram showing an illustrative method 84 of obtaining vehicle operating values from a vehicle management system (such as the engine management system 10) having a plurality of Electronic Control Units (ECUs) (such as the ECUs 12*a*, 14*a*, 14*b*, 16*a*) that control operation of a plurality of vehicle systems in accordance with sensed values provided by a plurality of vehicle sensors (such as the sensors 12*b*, 14*c*, 14*db*, 16*a*, 16*c*), the vehicle including a vehicle network (such as the vehicle network 18) that enables communication between the plurality of ECUs and the plurality of vehicle sensors. The method 84 includes connecting an access control module to the vehicle network, the access control module configured to pass a verification and validation process, as indicated at block 86.

A programmable module is connected to the access control module, the programmable module configured to accept diagnostic instructions without a verification and validation process, as indicated at block 88. The programmable module controller executes the diagnostic instructions in order to make one or more data requests for data from the plurality of vehicle sensors and/or the plurality of ECUs, the one or more data requests communicated to the access control module, as indicated at block 90.

The access control module executes the operating instructions in order to evaluate the one or more data requests from the programmable module, as indicated at block 92. The access control module forwards the one or more data requests to the vehicle network when the one or more data requests comply with the operating instructions, as indicated at block 94. The access control module blocks the one or more data requests from reaching the vehicle network when the one or more data requests do not comply with the operating instructions, as indicated at block 96. In some cases, as indicated at block 98, the access control module forwards the requested sensor values to the programmable module in accordance with the one or more data requests. The access control module is configured to protect the vehicle management system from errors that could otherwise be caused by the diagnostic instructions.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A control system for a vehicle having a powertrain, the powertrain including a plurality of powertrain systems, each of the plurality of powertrain systems including one or more Electronic Control Units (ECUs) and one or more sensors providing signals to each of the one or more ECUs, the control system comprising:

a vehicle network that is configured to permit communication between the plurality of ECUs and to enable the sensors to provide signals to their corresponding ECUs, at least one of the plurality of ECUs controlling operation of a corresponding powertrain system of the plurality of powertrain systems in response to the received signals;

a diagnostic system configured to be installed in the vehicle and operably coupled with the vehicle network, the diagnostic system comprising:

a first module that is configured to communicate with the vehicle network, the first module including:

a first module memory configured to store operating instructions for the first module, the operating instructions including a set of access rules;

a first module controller operably coupled with the first module memory, the first module controller configured to execute the operating instructions stored within the first module memory; and a second module that is configured to communicate with the first module, the second module including:

a second module memory that is configured to accept and store a set of diagnostic instructions that are communicated to the second module;

a second module controller operably coupled with the second module memory, the second controller configured to execute the diagnostic instructions;

wherein the second module controller, when executing the diagnostic instructions, makes one or more data requests that are communicated from the second module to the first module, and wherein the first module is configured to permit permissible data requests to be communicated through the vehicle network to one or more of the plurality of ECUs and to prevent impermissible data requests from being communicated through the vehicle network to one or more of the plurality of ECUs;

wherein the first module comprises an ECU that has undergone a verification and validation process;

wherein the verification and validation process includes verification and validation of the set of access rules;

wherein the set of access rules includes a first limit on how many data requests per time period the second module can make of any one ECU of the plurality of ECUs; and wherein the set of access rules includes a second limit on how many total data requests per time period the second module can make collectively of two or more of the plurality of ECUs.

2. The control system of claim 1, wherein the second module controller is configured, when executing the diagnostic instructions, to solicit signals from any of the sensors.

3. The control system of claim 1, wherein the second module controller is configured, when executing the diagnostic instructions, to solicit operating parameter values from any of the plurality of ECUs as long as said solicitation is in compliance with the set of access rules.

4. The control system of claim 1, wherein the set of access rules define a firewall implemented by the first module.

5. The control system of claim 4, wherein the firewall is configured to enable permissible data requests to pass to the vehicle network and to prevent impermissible requests to pass to the vehicle network.

6. The control system of claim 4, wherein the firewall is configured to block any communication from the second module that exceeds a scope of a permissible data request.

7. An diagnostic system configured to be installed in a vehicle having a vehicle management system that manages operation of a plurality of vehicle systems, the vehicle management system including a plurality of vehicle systems, each of the plurality of vehicle systems including one or more Electronic Control Units (ECUs) and one or more vehicle sensors providing signals to each of the one or more ECUs, at least one of the plurality of ECUs controlling operation of a corresponding vehicle system of the plurality of vehicle systems in response to the received signals, the vehicle management system including a vehicle network that is configured to permit communication between the plurality of ECUs and to enable the vehicle sensors to provide signals to their corresponding ECUs, the diagnostic system comprising:

an access control module that is configured to communicate with the vehicle network, the access control module including:

an access control module memory configured to store operating instructions for the access control module, the operating instructions including a set of access rules;

an access control module controller operably coupled with the access control module memory, the access control module controller configured to execute the operating instructions stored within the access control module memory; and a programmable module that is configured to communicate with the access control module, the programmable module including:

a programmable module memory that is configured to accept and store a set of diagnostic instructions that are communicated to the programmable module;

a programmable module controller operably coupled with the programmable module memory, the programmable module controller configured to execute the diagnostic instructions;

wherein the programmable module controller, when executing the diagnostic instructions, makes one or more data requests that are communicated from the programmable module to the access control module, and wherein the access control module is configured to permit permissible data requests to be communicated to the vehicle network and to prevent impermissible requests from being communicated to the vehicle network;

wherein the set of access rules includes a first limit on how many data requests per time period the programmable module can make of any one ECU of the plurality of ECUs; and wherein the set of access rules includes a second limit on how many total data requests per time period the programmable module can make collectively of two or more of the plurality of ECUs.

8. The diagnostic system of claim 7, wherein the programmable module controller is configured, when executing the diagnostic instructions, to solicit signals from any of the vehicle sensors.

9. The diagnostic system of claim 7, wherein the programmable module controller is configured to, when executing the diagnostic instructions, to solicit operating parameter values from any of the plurality of ECUs as long as said solicitation is in compliance with the set of access rules.

10. The diagnostic system of claim 7, wherein the set of access rules define a firewall implemented by the access control module.

11. The diagnostic system of claim 10, wherein the firewall is configured to block any communication from the programmable module that exceeds a scope of a permissible data request.

12. A method of updating a vehicle diagnostics system, the vehicle diagnostic system configured for use in a vehicle having a plurality of Electronic Control Units (ECUs) coupled to a vehicle network, the ECUs controlling operations in the vehicle and including a diagnostic module comprising a memory for recording diagnostics data and containing diagnostics instructions, a diagnostics controller configured to execute the diagnostics instructions to obtain diagnostics data from the ECUs via the vehicle network, and an access control module operatively coupling the diagnostic module to the vehicle network and configured to receive communications from the diagnostic module directed to the ECUs, apply access rules to the received communications, and only pass data requests from the diagnostics module through to the vehicle network which pass the access rules, the method comprising:

updating the diagnostics module to change communications from the diagnostics module issued through the access control module from first diagnostic configuration to a second diagnostic configuration, wherein the step of updating the diagnostics module is performed without updating the access control module;

wherein the step of updating the diagnostics module is performed without validating effects on the ECUs and vehicle network;

wherein the step of updating the diagnostics module is performed by defining the second diagnostic configuration, validating the second diagnostic configuration as it affects the diagnostics module and access control module, and deploying the second diagnostic configuration to the diagnostics module via an over the air update.

* * * * *